(12) United States Patent
Hashimoto

(10) Patent No.: US 11,068,759 B2
(45) Date of Patent: Jul. 20, 2021

(54) PRINTING APPARATUS CAPABLE OF USING A PLURALITY OF TYPES OF PRINTING PAPER FOR EXECUTING A FIRST CALIBRATION AND A SECOND CALIBRATION, AND A CONTROL SYSTEM

(71) Applicant: CANON KABUSHIKI KAISHA, Tokyo (JP)

(72) Inventor: Yasuhiko Hashimoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/734,747

(22) Filed: Jan. 6, 2020

(65) Prior Publication Data
US 2020/0234090 A1    Jul. 23, 2020

(30) Foreign Application Priority Data
Jan. 18, 2019    (JP) .............................. JP2019-007314

(51) Int. Cl.
*G06K 15/02*    (2006.01)

(52) U.S. Cl.
CPC ......... *G06K 15/027* (2013.01); *G06K 15/021* (2013.01)

(58) Field of Classification Search
CPC .. G06K 15/027; G06K 15/021; G01K 15/005; G01N 2201/12746; H04B 17/21
See application file for complete search history.

(56) References Cited

U.S. PATENT DOCUMENTS

| | | | |
|---|---|---|---|
| 9,333,782 B1 | 5/2016 | Hashimoto et al. | |
| 9,894,249 B2 | 2/2018 | Hashimoto et al. | |
| 10,506,108 B2 * | 12/2019 | Yano ................... | G06K 15/1868 |
| 2014/0176969 A1 * | 6/2014 | Yano ................... | G06K 15/1868 |
| | | | 358/1.9 |
| 2017/0280022 A1 * | 9/2017 | Kuroiwa .............. | H04N 1/6097 |

FOREIGN PATENT DOCUMENTS

JP    2016-212842 A    12/2016

* cited by examiner

*Primary Examiner* — Juan M Guillermety
(74) *Attorney, Agent, or Firm* — Venable LLP

(57) ABSTRACT

A printing apparatus includes a control unit to execute either one of a first calibration and a different second calibration in a case where a predetermined execution condition corresponding to a type of printing paper that is set in the printing apparatus is satisfied. The first calibration is executed when the type of printing paper that is set is a first type that is included in a plurality of types and the second calibration is executed when the type of printing paper that is set is a second type. The control unit determines whether the predetermined execution condition is satisfied, based on a relationship as to which is greater and which is smaller between a predetermined threshold value and a count value corresponding to a number of elapsed days since calibration was previously executed for the type of printing paper that is set in the printing apparatus.

14 Claims, 12 Drawing Sheets

| | CALIBRATION TYPE | DEGREE OF NECESSITY OF CALIBRATION | NUMBER OF ELAPSED DAYS |
|---|---|---|---|
| 6003 | COMMON CALIBRATION | 0 | 0 |
| 6004 | INDIVIDUAL CALIBRATION | 100 | 30 |

| PRINTING PAPER ID | CALIBRATION TYPE | AUTOMATIC CALIBRATION OPERATION | DEGREE OF NECESSITY OF CALIBRATION | NUMBER OF ELAPSED DAYS |
|---|---|---|---|---|
| 01 | COMMON CALIBRATION | Yes | 0 | 0 |
| 02 | COMMON CALIBRATION | No | N/A | N/A |
| 03 | INDIVIDUAL CALIBRATION | Yes | 100 | 30 |
| 04 | INDIVIDUAL CALIBRATION | Yes | 100 | 30 |
| 05 | CALIBRATION NOT ALLOWED | N/A | N/A | N/A |

| PRINTING PAPER ID | CALIBRATION TYPE | AUTOMATIC CALIBRATION OPERATION | DEGREE OF NECESSITY OF CALIBRATION | NUMBER OF ELAPSED DAYS |
|---|---|---|---|---|
| 01 | COMMON CALIBRATION | UNSET | 0 | 0 |
| 02 | COMMON CALIBRATION | UNSET | 0 | 0 |
| 03 | INDIVIDUAL CALIBRATION | UNSET | 100 | 30 |
| 04 | INDIVIDUAL CALIBRATION | UNSET | 100 | 30 |
| 05 | CALIBRATION NOT ALLOWED | UNSET | N/A | N/A |

FIG.10

PRINTING APPARATUS CAPABLE OF USING A PLURALITY OF TYPES OF PRINTING PAPER FOR EXECUTING A FIRST CALIBRATION AND A SECOND CALIBRATION, AND A CONTROL SYSTEM

BACKGROUND OF THE INVENTION

Field of the Invention

The present invention relates to a technology for controlling calibration of a printing apparatus.

Description of the Related Art

In a printing apparatus using an ink-jet technology, the discharge amount of ink changes due to manufacturing variability of print heads or aging. Therefore, even in a case where an image is formed based on the same image data, the color represented on a printing medium, such as printing paper, may fluctuate. Calibration is known as a technology for correcting input image data in order to reproduce a stable color on a printing medium. Color correction processing for image data by calibration is performed based on a result of color measurement of a printed printing medium on which a color patch is printed by a print head.

In Japanese Patent Laid-Open No. 2016-212842, there is disclosed a technology related to common calibration in which a result of color measurement on a given paper type by calibration can be applied to printing on another paper type. In addition, there is a technology that is referred to as individual calibration in which a result of color measurement by calibration is applied only to printing on a paper type on which the color measurement has been performed.

In the technology of Japanese Patent Laid-Open No. 2016-212842, operation for individual calibration is not described. Here, it is assumed that there is operation of calibration for a printing apparatus in which a paper type for which individual calibration is executed is used in addition to a paper type for which common calibration is executed. In this case, the number of paper types to be a correction target differs between common calibration and individual calibration. Therefore, in a case where common calibration and individual calibration are executed under the same condition, there may be a case in which calibration is not executed although the calibration should be executed or a case in which calibration is executed against desire of the user.

SUMMARY OF THE INVENTION

The present invention is a printing apparatus for executing a first calibration and a second calibration, the first calibration being executed for calculating a correction value that is common for each of a plurality of types of printing paper, the second calibration being executed for calculating a correction value for one or more types of printing paper that are not included in the plurality of types of printing paper, the number of the one or more types of printing paper being fewer than the plurality of types of printing paper, the printing apparatus comprising: a control unit configured to control the printing apparatus to execute either one of the first calibration and the second calibration in a case where a predetermined execution condition corresponding to a type of printing paper that is set in the printing apparatus is satisfied, wherein the control unit is configured to control the printing apparatus to execute the first calibration in a case where the type of printing paper that is set in the printing apparatus is a first type that is included in the plurality of types and is configured to control the printing apparatus to execute the second calibration in a case where the type of printing paper that is set in the printing apparatus is a second type that is not included in the plurality of types, and wherein the predetermined execution condition corresponding to the first type is a first condition and the predetermined execution condition corresponding to the second type is a second condition, the first condition and the second condition being different from each other.

Further features of the present invention will become apparent from the following description of exemplary embodiments with reference to the attached drawings.

BRIEF DESCRIPTION OF THE DRAWINGS

FIG. 6 is a figure illustrating threshold values for calibration for respective calibration types;

FIG. 7 is a figure illustrating calibration types and calibration execution conditions corresponding to respective paper types;

FIG. 10 is a figure illustrating calibration types and calibration execution conditions corresponding to respective paper types;

DESCRIPTION OF THE EMBODIMENTS

Hereinafter, a detailed explanation is given of preferred embodiments with reference to the accompanying drawings. It should be noted that the following embodiments do not limit the invention according to the scope of patent claims and that all combinations of the characteristics explained in the following embodiments are not necessarily essential to the solution means of the invention.

First Embodiment

[System Configuration]

Figure 1:
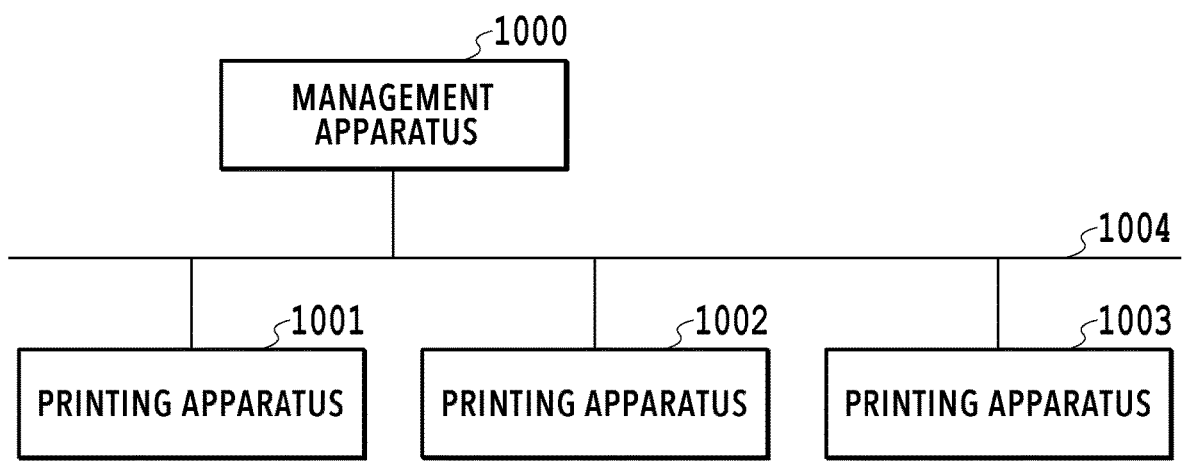
FIG. 1 is a figure illustrating an example of a system configuration.

FIG. 1 is a figure illustrating an example of a system configuration of the present embodiment. The present embodiment is explained as a control system including multiple printing apparatuses and a management apparatus for managing calibration of the printing apparatuses. The present system includes a management apparatus 1000, multiple printing apparatuses 1001 to 1003, and a network 1004.

The management apparatus 1000 is an information processing apparatus such as a server connected to the printing apparatuses 1001 to 1003 via the network 1004. The printing apparatus 1001 is provided with a calibration function, which is performed for maintaining a constant tint for printing. The management apparatus 1000 performs management and a setting of calibration by the printing apparatuses 1001 to 1003. Note that there may be a mode in which any one of the printing apparatuses 1001 to 1003 functions as the management apparatus 1000.

In the explanation of the present embodiment, it is assumed that there are three printing apparatuses 1001 to 1003 as management targets of the management apparatus 1000. However, the number of printing apparatuses is not limited to three. There may be a given number of printing apparatuses to be management targets of the management apparatus 1000. Hereinafter, an explanation is given of the printing apparatus 1001 on behalf of the printing apparatuses 1001 to 1003 unless otherwise specified. However, the printing apparatus 1002 and the printing apparatus 1003 have the same functions as the printing apparatus 1001 as well. Although the printing apparatus 1001 is explained as one of multiple ink-jet printers capable of performing large-format printing in the explanation of the present embodiment, the printing apparatus 1001 is not limited thereto. For example, the printing apparatus 1001 may be an ink-jet printer that performs printing on printing paper having a size such as A4.

[About Calibration]

Here, an explanation is given of calibration performed by the printing apparatus 1001 in the present embodiment. The printing apparatus 1001 prints a patch on printing paper, based on patch data that is preliminarily held. The printing apparatus 1001 performs color measurement by use of a built-in sensor for the printing paper on which a patch is printed. The printing apparatus 1001 holds target data (target value) for each type of printing paper (paper type) and calculates a target value which is specifically a color correction value corresponding to a paper type on which a patch is printed, based on a result of color measurement by the sensor. That is, a color correction value corresponding to a type of printing paper on which a patch is printed is calculated. Hereinafter, the process of printing a patch on printing paper, performing color measurement on the printing paper on which the patch is printed, and calculating a color correction value is referred to as "calibration".

The printing apparatus 1001 performs color correction processing by applying a color correction value, which is obtained as a result of executing calibration, to print data. Here, since a color correction value corresponding to a paper type is calculated, color correction processing corresponding to the paper type, which is the printing target, is performed. Since the printing apparatus 1001 performs printing based on print data on which color correction processing has been performed, it is possible to reproduce stable colors on a printing medium.

[Calibration Type]

The calibration executed by the printing apparatus 1001 of the present embodiment includes two types of calibration: "common calibration" and "individual calibration". A color correction value obtained by executing "common calibration" can be applied to printing on other paper types as well. Therefore, by applying a correction value calculated by executing "common calibration" to a given paper type, it is possible to maintain a constant tint even for printing on other paper types. The paper type to be a target of executing common calibration is referred to as a "common calibration paper type", which is a paper type on which the characteristics of the head are well reflected in a case where a patch is printed on the paper type.

On the other hand, a correction value obtained as a result of executing "individual calibration" to a given paper type is only applied to printing on that paper type. That is, unlike common calibration, a result of executing individual calibration cannot be applied to other paper types. The paper type to be a target of executing individual calibration is referred to as an "individual calibration paper type".

There is a case in which, although a given paper type is an individual calibration paper type, individual calibration for calculating a color correction value for the paper type has not been executed. In this case, a correction value obtained as a result of executing common calibration can be applied to printing on the individual calibration paper type. Furthermore, there is a case in which, although a given paper type is a common calibration paper type, calibration for calculating a color correction value for the paper type has not been executed. In this case, a correction value obtained as a result of common calibration executed for another common calibration paper type can be applied as well to the printing by use of the paper type.

A paper type that is not suitable for both of common calibration and individual calibration and therefore is not to be a target of executing calibration is referred to as "calibration non-executable printing paper". To printing on calibration non-executable printing paper, a correction value obtained as a result of common calibration performed on another paper type is always applied.

Information as to whether a paper type is the common calibration paper type, the individual calibration paper type, or the calibration non-executable printing paper is preliminarily stored in the printing apparatus 1001. In addition, the user can customize registration in the printing apparatus 1001 to register information about a paper type that is not preliminarily stored in the printing apparatus 1001, based on data related to the common calibration paper type and the individual calibration paper type. For example, data obtained as a result of changing the printing paper name, the head height, the paper feed adjustment, the attraction force, or the like, of printing paper data that is preliminarily stored in the printing apparatus 1001 can be registered in the printing apparatus 1001 as data of a customized paper type by the user. Furthermore, by setting a target value of calibration for a customized paper type, it is also possible for the user to register the customized paper type in the printing apparatus 1001 as the individual calibration paper type.

In the present embodiment, in a case where multiple paper types are used, by managing conditions for executing calibration for the respective paper types, a printing apparatus that is capable of executing multiple types of calibration executes a type of calibration corresponding to a paper type.

[Hardware Configuration of Printing Apparatus]

Figure 2:
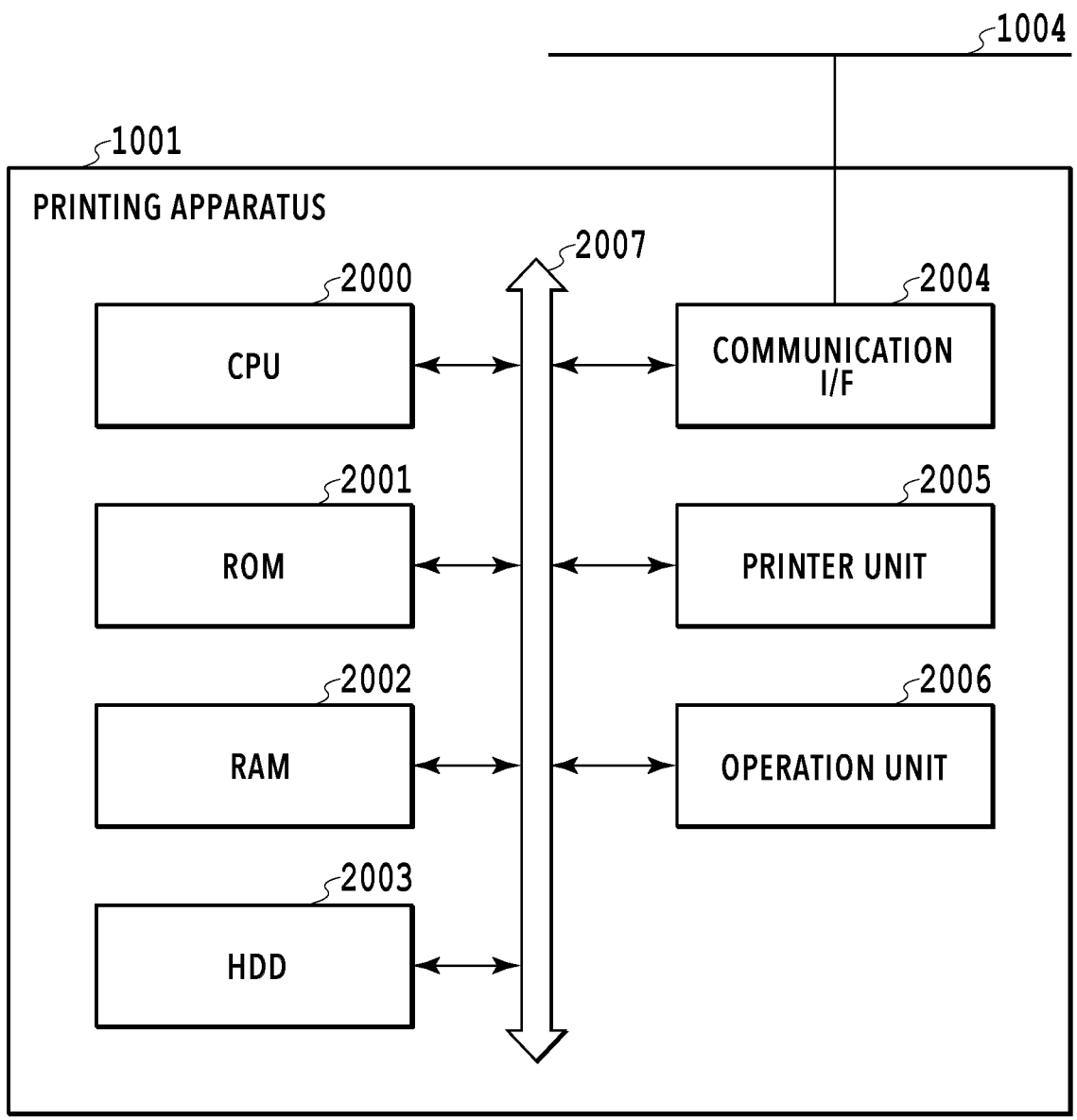
FIG. 2 is a figure illustrating a hardware configuration of a printing apparatus.

FIG. 2 is a figure illustrating an example of a hardware configuration of the printing apparatus 1001. The printing apparatus 1001 includes a CPU 2000, a ROM 2001, a RAM 2002, an HDD 2003, a communication I/F 2004, a printer unit 2005, and an operation unit 2006.

The CPU 2000 operates, based on a control program stored in the ROM 2001 or the HDD 2003. The CPU 2000 outputs an image signal as output information to the printer unit (printer engine) 2005 via a system bus 2007. Furthermore, via the communication I/F 2004, the CPU 2000 can perform processing for communicating with the management apparatus 1000 and transmit information about the printing apparatus 1001 to the management apparatus 1000.

Moreover, the CPU 2000 can receive a print job to be output to the printer unit 2005 via the communication I/F 2004.

The RAM 2002 functions as a main memory, a work area, or the like, of the CPU 2000. The RAM 2002 is configured so that the memory capacity can be expanded by an optional RAM connected to an expansion port. Furthermore, the RAM 2002 is used as an output information rendering area, an environment data storage area, or the like, for printing a print job. The HDD (hard disk) 2003 stores information related to font data, printing paper data, or the like.

The operation unit 2006 is a part for the user to operate the printing apparatus 1001. For example, the operation unit 2006 includes a panel, so that various settings of the printing apparatus 1001 are performed via the operation unit 2006.

In the present embodiment, unless otherwise specified, the CPU 2000 controls each unit connected to the system bus 2007 via the system bus 2007. Since the printing apparatuses 1002 and 1003 have the same configuration as the printing apparatus 1001, the explanation of the printing apparatuses 1002 and 1003 is omitted.

[Hardware Configuration of Management Apparatus]

Figure 3:
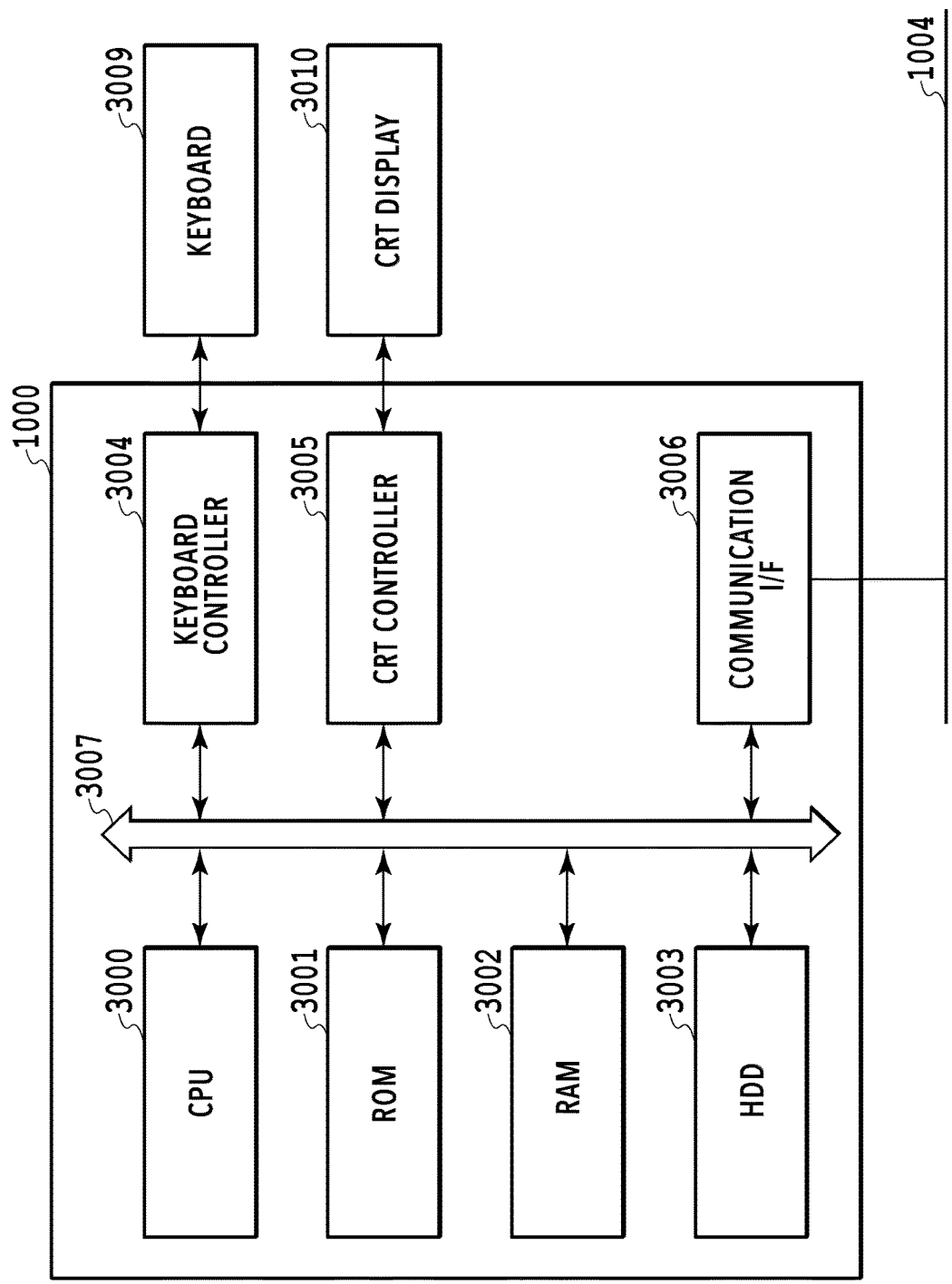
FIG. 3 is a figure illustrating a hardware configuration of a management apparatus.

FIG. 3 is a figure illustrating an example of a hardware configuration of the management apparatus 1000. The management apparatus 1000 includes a CPU 3000, a ROM 3001, a RAM 3002, an HDD 3003, a keyboard controller 3004, a CRT controller 3005, and a communication I/F 3006. Furthermore, a keyboard 3009 and a CRT display 3010 are connected to the management apparatus 1000.

The CPU 3000 retrieves various programs, such as a control program, a system program, and an application program stored in the ROM 3001 or the HDD 3003, into the RAM 3002. Furthermore, the CPU 3000 executes various programs retrieved into the RAM 3002 to perform various kinds of data processing. The CPU 3000 may be a dedicated circuit such as an ASIC.

The CPU 3000 acquires various kinds of setting data held in the printing apparatuses 1001 to 1003 via the communication I/F 3006 and temporarily stores the various kinds of setting data in the RAM 3002. The CPU 3000 processes the various kinds of setting data temporarily stored in the RAM 3002 and transmits the data to the printing apparatuses 1001 to 1003 via the communication I/F 3006 again. In the present embodiment, unless otherwise specified, the CPU 3000 controls each unit connected to the system bus 3007 via the system bus 3007.

The RAM 3002 is configured so that the capacity thereof can be expanded by an optional RAM, or the like, and is mainly utilized as a work area for the CPU 3000. The keyboard controller 3004 controls a key input from the keyboard 3009, a pointing device (not illustrated in the figure), or the like.

The CRT controller 3005 controls a display on the CRT display 3010. Note that, although a display unit connected to the management apparatus 1000 in the present embodiment is explained as the CRT display 3010, the display unit is not limited to the CRT display 3010.

[Software Configuration of Management Apparatus]

Figure 4:
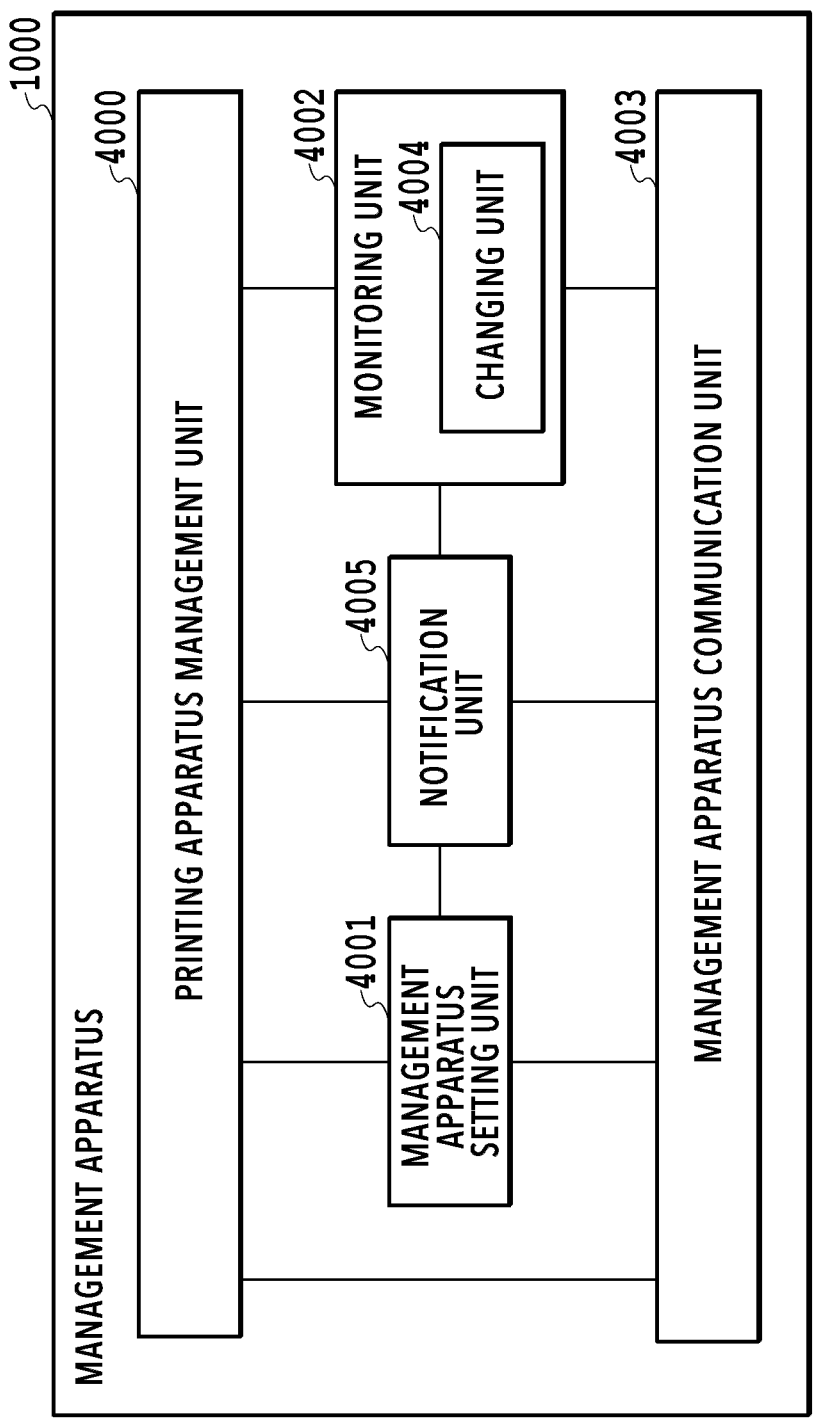
FIG. 4 is a figure illustrating a software function configuration of the management apparatus.

FIG. 4 is a figure illustrating an example of a function configuration of software related to the management apparatus 1000. The management apparatus 1000 includes a printing apparatus management unit 4000, a management apparatus setting unit 4001, a monitoring unit 4002, a management apparatus communication unit 4003, and a notification unit 4005.

The management apparatus communication unit 4003 transmits and receives communication data to and from the printing apparatuses 1001 to 1003 via the network 1004. Furthermore, the management apparatus communication unit 4003 searches for a printing apparatus on the network 1004 by use of a search protocol, such as the SNMP protocol, based on an instruction from the printing apparatus management unit 4000. The search protocol is not limited to the SNMP protocol, and any protocol that can search for the printing apparatuses 1001 to 1003 may be used. The management apparatus communication unit 4003 transmits access destination information of the searched printing apparatus to the printing apparatus management unit 4000.

The printing apparatus management unit 4000 manages printing apparatuses by use of access destination information of the printing apparatuses such as listed IP addresses, which is acquired from the management apparatus communication unit 4003. The printing apparatus management unit 4000 may manage one or more printing apparatuses.

The monitoring unit 4002 monitors settings related to operation of calibration for the printing apparatuses 1001 to 1003 managed by the printing apparatus management unit 4000. Details of the monitoring processing by the monitoring unit 4002 are described later in the explanation of the third embodiment. A changing unit 4004 changes a setting related to operation of calibration for the printing apparatuses 1001 to 1003 to a predetermined setting. The notification unit 4005 notifies predetermined information to a notification destination, which is an e-mail preliminarily registered in the management apparatus 1000.

The management apparatus setting unit 4001 sets conditions for executing calibration for the printing apparatus 1001 for each paper type for which operation of calibration is performed. Note that the first embodiment may be a mode without the management apparatus setting unit 4001. The management apparatus setting unit 4001 mainly functions in the second embodiment and the third embodiment, which are described later.

Each unit in the software configuration of the management apparatus 1000 can be configured as a program module. In that case, each program module is stored in the ROM 3001 or the HDD 3003. Each program module retrieved into the RAM 3002 by the CPU 3000 is controlled and executed by the CPU 3000.

[Software Configuration of Printing Apparatus]

Figure 5:
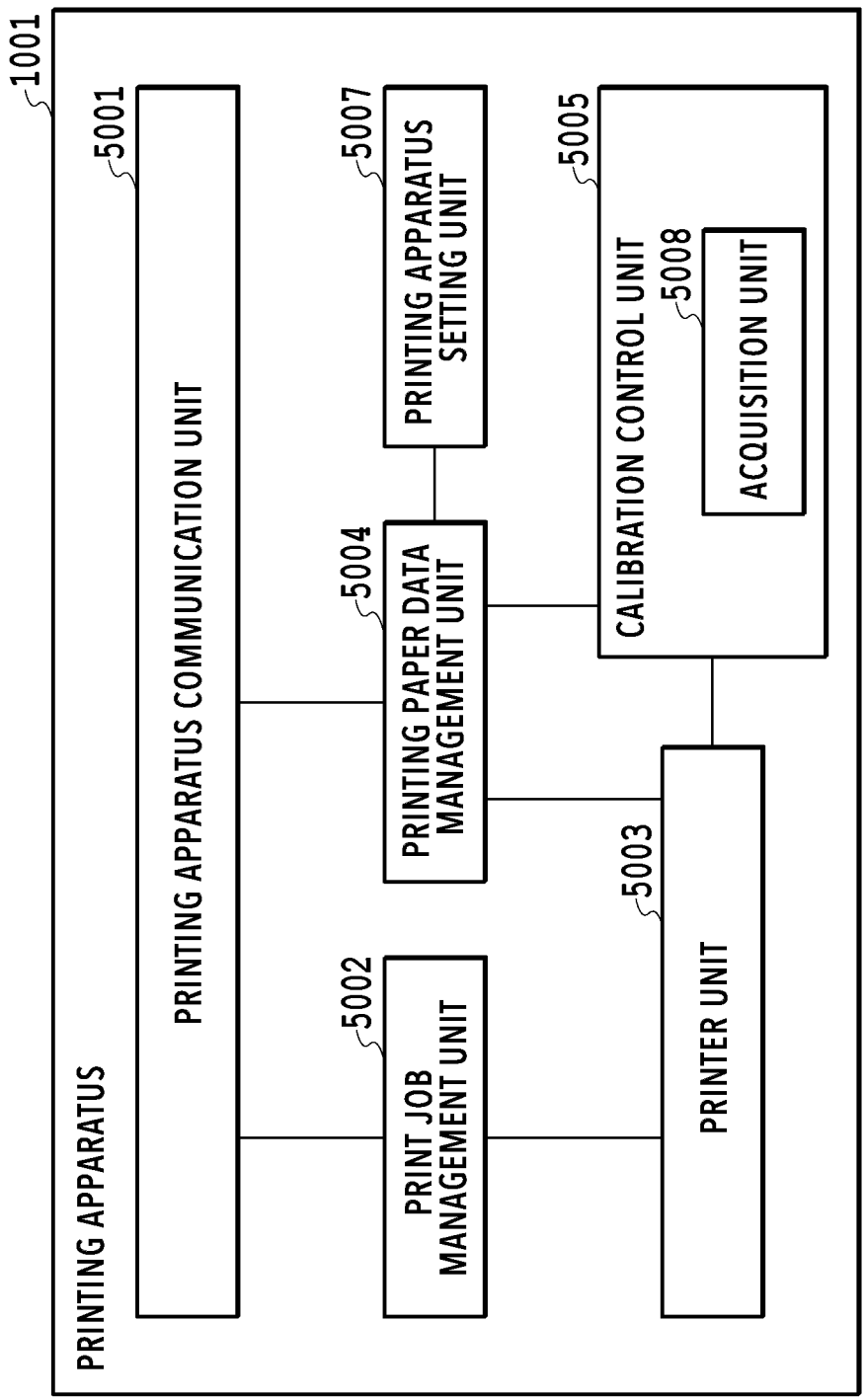
FIG. 5 is a figure illustrating a software function configuration of the printing apparatus.

FIG. 5 is a figure illustrating an example of a software function configuration related to the printing apparatus 1001. The printing apparatus 1001 includes a printing apparatus communication unit 5001, a print job management unit 5002, a printer unit 5003, a printing paper data management unit 5004, a calibration control unit 5005, and a printing apparatus setting unit 5007.

The printing apparatus communication unit 5001 transmits and receives communication data to and from the management apparatus 1000 and receives print job data from a print job data transmission device (not illustrated in the figure) via the network 1004.

The print job management unit 5002 spools all of the received print job data and then transfers the print job data to the printer unit 5003. The print job management unit 5002 performs control of a print job such as control of printing order, cancellation of printing, and pausing of printing. Alternatively, there may be a mode in which the print job management unit 5002 sequentially transfers received print job data to the printer 5003.

The printer unit 5003 performs control for printing on a printing medium, based on print job data transferred from the print job management unit 5002. Furthermore, the printer unit 5003 executes calibration, based on an instruction from the calibration control unit 5005.

The printing paper data management unit 5004 manages printing paper data for each paper type, which is necessary for printing processing on a paper type designated in print job data. Printing paper data managed by the printing paper data management unit 5004 is stored in a printing paper data storage unit in the ROM 2001 or the HDD 2003. For example, an execution condition table (see FIG. 7) holding calibration execution conditions, etc., for each paper type is stored as printing paper data. In addition, the printing paper data may include a group of mechanical parameters and a target value of calibration. The group of mechanical parameters includes data indicating a head height, a printing paper feeding amount, etc. The target value of calibration is data used as a correction target for executing calibration in the printing apparatus 1001. Additionally, the printing paper data management unit 5004 adds printing paper, deletes printing paper, and updates printing paper in such a table stored as printing paper data.

The calibration control unit 5005 instructs the printer unit 5003 to execute calibration. Details are described later. An acquisition unit 5008 acquires data related to a paper type being fed to the printing apparatus 1001. Note that the state of "being fed" in the present embodiment may be a state in which printing paper is set in the printing apparatus 1001 or a state in which the printing paper has been conveyed by a paper feeding roller, or the like, provided in the printing apparatus 1001 from the state in which the printing paper is set.

The printing apparatus setting unit 5007 sets a calibration execution condition for each paper type in the later-described execution condition table (see FIG. 7) to be stored in the HDD 2003. The storage destination may be a non-volatile memory, or the like, instead of the HDD 2003. Details are described later.

Each unit in the software configuration of the printing apparatus 1001 can be configured as a program module. In that case, each program module is stored in the ROM 2001 or the HDD 2003. Each program module retrieved into the RAM 2002 by the CPU 2000 is controlled and executed by the CPU 2000.

[Calibration Execution Condition]

FIG. 6 is a figure illustrating a table for managing threshold values for the printing apparatus 1001 to automatically perform either common calibration or individual calibration. The table in FIG. 6 is preliminarily stored in the printing apparatus 1001. The table in FIG. 6 is used in a case where the later-described execution condition table (see FIG. 7) for managing calibration execution conditions, etc., for each paper type is set by the printing apparatus setting unit 5007.

The row 6003 holds threshold values for determining whether an execution condition for common calibration is satisfied. Further, the row 6004 holds threshold values for determining whether an execution condition for individual calibration is satisfied. The column 6001 holds threshold values for a count value of "DEGREE OF NECESSITY OF CALIBRATION" as one of the threshold values for setting execution conditions for calibration. A count value of "DEGREE OF NECESSITY OF CALIBRATION" is a value managed in the printing apparatus 1001 for each paper type and is a value calculated based on the number of sheets to be printed, or the like, corresponding to a paper type. In a case where the later-described count value of "DEGREE OF NECESSITY OF CALIBRATION" managed in the printing apparatus 1001 is equal to or greater than a threshold value held in the column 6001, calibration is executed.

For example, in the printing apparatus 1001, in a case where the number of sheets to be printed is 5, a count value of "DEGREE OF NECESSITY OF CALIBRATION" is converted and counted as "1". In the column 6001 of individual calibration in FIG. 6, "100" is held as a threshold value. Therefore, regarding a given paper type that is set for execution of individual calibration, in a case where the accumulative number of sheets to be printed reaches 500, the count value of "DEGREE OF NECESSITY OF CALIBRATION" becomes a value that is equal to or greater than "100", which is the threshold value. Then, individual calibration is executed for that paper type. Details are described later. A count value of "DEGREE OF NECESSITY OF CALIBRATION" may be calculated based on the amount of ink discharged from the print head and may be any types of data as long as the count value serves as a judgment standard for executing calibration.

The column 6002 is a column for holding threshold values of the number of elapsed days for setting a calibration execution condition. The printing apparatus 1001 manages, for each paper type, a count value of the number of elapsed days since the day in which calibration was previously executed. In a case where the count value of the number of elapsed days since the day in which calibration was previously executed for a given paper type becomes equal to or greater than a threshold value held in the column 6002, calibration is executed for that paper type. In the column 6002 of FIG. 6, "30" is held as the threshold value for individual calibration. Therefore, in a case where 30 days or more have elapsed since calibration was previously executed for a paper type that is set for execution of individual calibration, calibration is executed for that paper type.

As described above, a count value of "DEGREE OF NECESSITY OF CALIBRATION" and a count value of the number of elapsed days since the day in which calibration was previously executed, which are managed in the printing apparatus 1001, are managed for each paper type. In this management, in a case where calibration is executed for a given paper type, the count value of "DEGREE OF NECESSITY OF CALIBRATION" and the count value of the number of elapsed days since the day in which calibration was previously executed for that paper type are reset and become 0.

Note that there may be a mode in which the threshold values held in the table of FIG. 6 can be changed by the user as needed. For example, there may be a mode in which, in a case where it is desired that the frequency of execution of individual calibration is increased, a threshold value for executing individual calibration, which is held in the row 6004, can be changed into a smaller value.

FIG. 7 is a figure illustrating an example of an execution condition table in which execution conditions, etc., for respective paper types for determining whether a calibration execution condition is satisfied are held. In the execution condition table in the present embodiment, a value indicating a printing paper ID (printing paper ID value) for identifying a paper type and threshold values, etc., for executing calibration for that paper type are held in association with each other in each of the rows 7005 to 7009.

The column 7000 holds printing paper ID values for identifying a paper type. The column 7001 holds values indicating a type of calibration executed for a paper type corresponding to a printing paper ID value held in the column 7000. The values indicating "COMMON CALIBRATION" held in the column 7001 indicate that common calibration is executed in a case of executing calibration for the paper types corresponding to the printing paper ID values held in the column 7000. Furthermore, the values indicating "INDIVIDUAL CALIBRATION" held in the column 7001 indicate that individual calibration is executed in a case of executing calibration for the paper types corresponding to the printing paper ID values held in the column 7000. The value indicating "CALIBRATION NOT ALLOWED" held in the column 7001 indicates that neither common calibration nor individual calibration is executed for the paper type. Executable calibration for a paper type is preliminarily stored in the printing apparatus 1001 for each paper type in accordance with the characteristics of the paper type.

The column 7002 holds values indicating whether to perform operation of automatically executing calibration for a paper type corresponding to a printing paper ID value held in the column 7000. "Yes" held in the column 7002 indicates that calibration is automatically executed for the paper type in a case where the later-described calibration execution mode is an automatic mode and a predetermined condition is satisfied. "No" held in the column 7002 indicates operation in which calibration is not automatically executed is performed for the paper type. "N/A" in the column 7002 indicates that operation of calibration is not applicable to the paper type. The setting of "Yes" or "No" held in the column 7002 is performed by the user at the start of operation of the printing apparatus 1001.

In FIG. 7, "01" and "02" are held as the two printing paper ID values of which the values indicating a calibration type in the column 7001 indicate "COMMON CALIBRATION". In this way, there may be a case in which, among the printing paper ID values held in the column 7000, multiple printing paper ID values are present as values indicating "COMMON CALIBRATION" in the column 7001. In such a case, among the printing paper ID values other than a printing paper ID value that is set to "Yes", the printing apparatus setting unit 5007 may change the automatic calibration operation of a printing paper ID value whose calibration type is common calibration to "No".

For example, it is assumed that the automatic calibration operation of printing paper ID value "02" in FIG. 7 whose calibration type is common calibration is changed to "Yes". In this case, there may be a mode in which the printing apparatus setting unit 5007 changes the automatic calibration operation of printing paper ID value "01", which is another paper type that can be a target of automatic operation of common calibration, to "No". A result of executing common calibration for a given paper type is applied to the other paper types as well. For this reason, there is no problem as long as there is one paper type that is to be a target of execution of common calibration.

The column 7003 holds threshold values of a degree of necessity of calibration corresponding to the column 6001 in the table of FIG. 6. The column 7004 holds threshold values of the number of elapsed days corresponding to the column 6002 in the table of FIG. 6. In a case where a value indicating "CALIBRATION NOT ALLOWED" is held in the column 7001 or in a case where a value indicating "No" is held in the column 7002, calibration is not executed. Therefore, in the column 7003 and the column 7004 of the execution condition table, values indicating "N/A", which indicate that settings of threshold values for executing calibration are not applicable, are held. [Processing Procedure for Setting Execution Condition Table]

Figure 8:
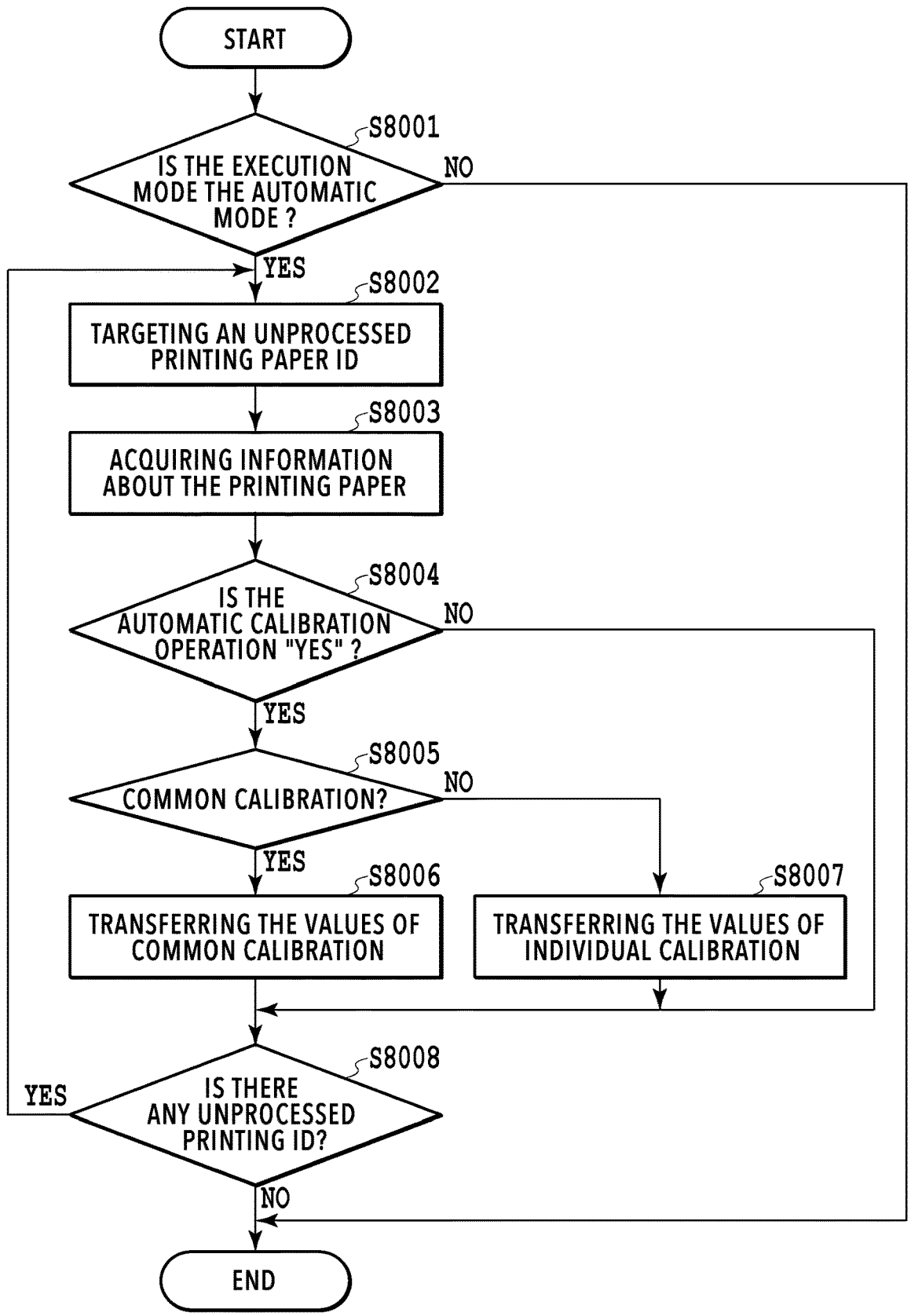
FIG. 8 is a flowchart for explaining processing for setting a calibration execution condition.

FIG. 8 is a flowchart illustrating processing for setting an "execution condition table". The series of processes illustrated in the flowchart of FIG. 8 is performed by the CPU of the printing apparatus 1001 retrieving a program code stored in the ROM into the RAM and executing the program code. Furthermore, a part or all of the functions in the steps of FIG. 8 may be implemented by hardware such as an ASIC or an electronic circuit. Note that the symbol "S" in the explanation of each process means that it is a step in the flowchart, and the same applies to the following flowcharts.

Among the values held in the execution condition table, the printing paper ID values in the column 7000 and the values indicating a calibration type in the column 7001 are preliminarily stored in the printing apparatus 1001. Furthermore, the values indicating automatic calibration operation in the column 7002 are set by the user at the start of operation of the printing apparatus 1001. In the following, an explanation is given of a process of transferring values corresponding to each printing paper ID value to the column 7003 and the column 7004, which hold threshold values for executing calibration. The process explained below is performed in a case where the user provides the printing apparatus with an instruction for setting a calibration execution condition. For example, the process is performed in a case where the user presses an execution button on a "calibration execution condition setting" screen from a panel menu on the operation unit 2006 of the printing apparatus 1001. Alternatively, there may be a mode in which the process explained below is performed in a case where the later-described execution mode is switched from a manual mode to an automatic mode.

In S8001, the printing apparatus setting unit 5007 determines whether the calibration execution mode is the automatic mode. The calibration execution mode of the printing apparatus 1001 includes a manual mode and an automatic mode.

The manual mode is a mode in which the calibration control unit 5005 of the printing apparatus 1001 performs control for executing calibration in a case where the user operates the operation unit 2006 of the printing apparatus 1001 to instruct the printing apparatus 1001 for executing calibration.

The automatic mode is a mode in which the calibration control unit 5005 of the printing apparatus 1001 determines whether execution of calibration is allowed or not and performs control for executing calibration according to the determination result. It is possible that the calibration execution mode can be switched by the user between the automatic mode and the manual mode. For example, the printing apparatus 1001 may be in the manual mode at the time of shipment and can be set to the automatic mode later by the user. Alternatively, the printing apparatus 1001 may be in the automatic mode at the time of shipment and can be changed to the manual mode later by the user.

In a case where it is not determined that the calibration execution mode is the automatic mode in S8001 (NO in S8001), the calibration execution mode of the printing apparatus is the manual mode. Therefore, since the printing apparatus setting unit 5007 need not set calibration execution conditions, the flow is ended. In a case where it is determined that the calibration execution mode is the automatic mode in S8001 (YES in S8001), the processing proceeds to S8002 for setting calibration execution conditions for each paper type.

Subsequently, in S8002 to S8008, the processes of S8002 to S8008 are repeated for each printing paper ID value held in the execution condition table of the printing apparatus 1001. That is, a printing paper ID value that is a process target is targeted from among unprocessed printing paper ID values in S8002, and the processes of S8003 to S8008 are performed. In a case where processing for a printing paper ID value that is a process target is completed, the processing returns to S8002 and a printing paper ID value that is a process target is targeted from among unprocessed printing paper ID values again. In a case where there are no more unprocessed printing paper ID values, the processing is ended.

In S8003, the printing apparatus setting unit 5007 acquires values relating to the calibration type and the automatic calibration operation of a printing paper ID value that is a process target from the execution condition table. At the start of the present flowchart, the column 7001 of the execution condition table holds a value indicating a calibration type for each printing paper ID value. Furthermore, the column 7002 of the execution condition table holds a value indicating that the setting of the automatic calibration operation is either one of "Yes", "No", and "N/A" for each printing paper ID value. The printing apparatus setting unit 5007 acquires a value held in each of the column 7001 and the column 7002 corresponding to a printing paper ID value that is a process target, as information about the printing paper ID value that is the process target, from the execution condition table.

In S8004, based on the value acquired in S8003, the printing apparatus setting unit 5007 determines whether the setting of performing the automatic calibration operation for the printing paper ID value that is the process target is "Yes". In a case where the setting of performing the automatic calibration operation for the printing paper ID value that is the process target is "Yes" (YES in S8004), the processing proceeds to S8005.

In a case where it is determined that the setting of performing the automatic calibration operation of the printing paper ID value that is the process target is "No" or "N/A" (NO in S8004), calibration is not automatically executed for the paper type of the printing paper ID value that is the process target. Therefore, there is no need to set execution conditions. Thus, the processing proceeds to S8008.

In S8005, the printing apparatus setting unit 5007 determines whether the calibration type of the printing paper ID value that is the process target is common calibration, based on the value acquired in S8003.

In a case where it is determined that the calibration type of the printing paper ID value that is the process target is "COMMON CALIBRATION", the printing apparatus setting unit 5007 transfers the values in the row 6003 of the table in FIG. 6 to the corresponding locations of the execution condition table in S8006. That is, the printing apparatus setting unit 5007 acquires each of the threshold values for common calibration, which are held in the column 6001 and the column 6002 of the table in FIG. 6. Next, of the acquired threshold values, the printing apparatus setting unit 5007 transfers the threshold value of the degree of necessity of calibration in the column 6001 to the column 7003 configured to hold a threshold value of a degree of necessity of calibration in the row corresponding to a printing paper ID value that is a process target in the execution condition table. Furthermore, of the acquired threshold values, the threshold value of the number of elapsed days in the column 6002 is transferred to the column 7004 configured to hold a threshold value of the number of elapsed days in the row corresponding to a printing paper ID value that is a process target in the execution condition table. Upon completion of the process, the processing proceeds to S8008.

On the other hand, in a case where it is determined that the calibration type of the printing paper ID value of the process target is "INDIVIDUAL CALIBRATION", the printing apparatus setting unit 5007 transfers the values in the row 6004 of the table in FIG. 6 to the corresponding locations in the execution condition table in S8007. That is, the printing apparatus setting unit 5007 acquires each of the threshold values for individual calibration, which are held in the column 6001 and the column 6002 of the table in FIG. 6. Next, of the acquired threshold values, the printing apparatus setting unit 5007 transfers the threshold value of the degree of necessity of calibration in the column 6001 to the column 7003 configured to hold a threshold value of a degree of necessity of calibration in the row corresponding to a printing paper ID value that is a process target in the execution condition table. Furthermore, of the acquired threshold values, the threshold value of the number of elapsed days in the column 6002 is transferred to the column 7004 configured to hold a threshold value of the number of elapsed days in the row corresponding to a printing paper ID value that is a process target in the execution condition table. Upon completion of the process, the processing proceeds to S8008.

In a case where there is an unprocessed printing paper ID value in S8008, the processing returns to S8002 to repeat the processes. In a case where there is no unprocessed printing paper ID value, the present flow is ended. By performing the above processes, the execution condition table of FIG. 7 can be set or updated.

Note that there may be a mode in which the threshold values of the execution condition table can be changed for each paper type by the user. For example, there may be a mode in which the threshold values held in the column 7003 for printing paper ID value "03" and printing paper ID value "04" in FIG. 7 are not the same and may be changed by the user to different threshold values.

[Processing Procedure for Executing Calibration]

Figure 9:
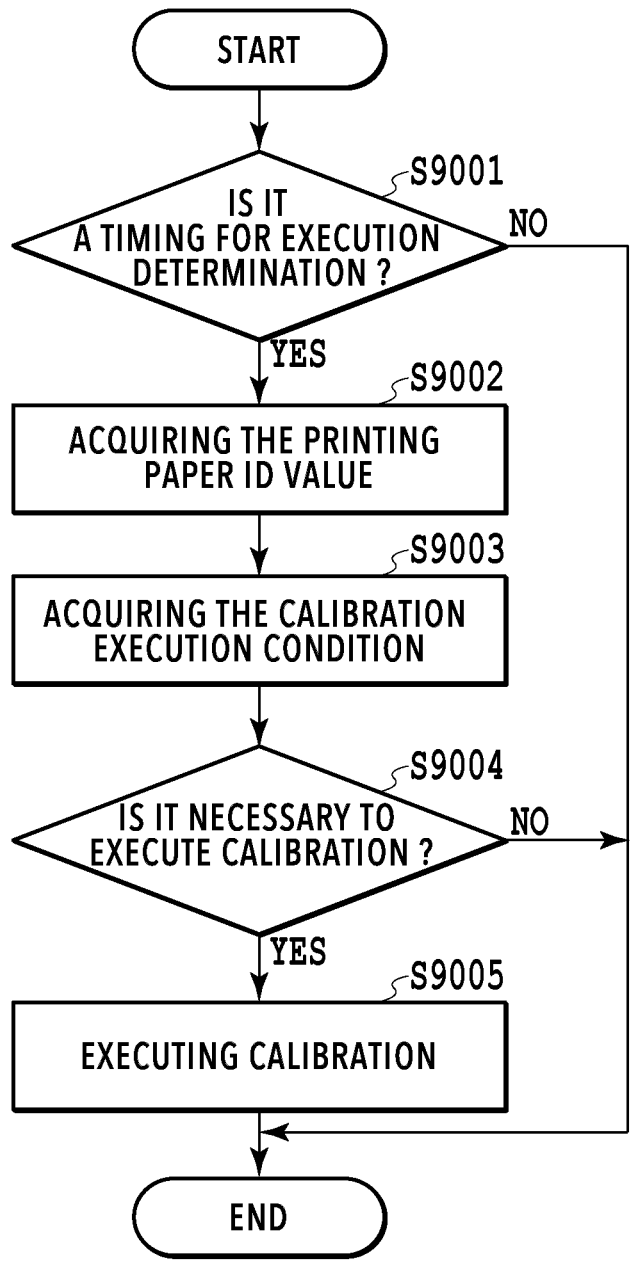
FIG. 9 is a flowchart for explaining processing for controlling execution of calibration.

FIG. 9 is a flowchart illustrating the contents of processing performed by the printing apparatus for automatically executing calibration in a case where the execution mode for executing calibration of the printing apparatus is the automatic mode. Based on FIG. 9, an explanation is given of processing for the printing apparatus 1001 of the present embodiment to automatically execute calibration.

In S9001, the calibration control unit 5005 of the printing apparatus 1001 determines whether it is a predetermined timing for determining whether to execute calibration. For example, the predetermined timing includes: a timing in which the printing apparatus 1001 is activated (a timing in which the electric power source is turned on); a timing in which a print job is received; a timing in which printing of a print job is completed; a timing in which printing paper is fed (a timing in which roll paper is fed); a timing of returning from sleep; and after replacement of an ink tank. Alternatively, a method of determining that it is a predetermined timing for executing calibration every time a predetermined amount of time elapses may be used. In the following explanation of the present embodiment, it is assumed that a timing in which roll paper is fed to the printing apparatus is the timing for determining whether to execute calibration. That is, in a case where it is the timing in which roll paper is fed in S9001, the processing proceeds to S9002.

In S9002, based on an input by the user, the calibration control unit 5005 acquires the printing paper ID value of the paper type fed to the printing apparatus 1001. The method for the calibration control unit 5005 to acquire the printing paper ID value of the fed paper type is not limited to the method based on a value input by the user. For example, it is assumed that information about the paper type is recorded as barcode information on the fed printing paper. In this case, a method in which the calibration control unit 5005 reads the barcode information in a case where the printing paper is set, so as to acquire the printing paper ID value of the paper type, may be used.

In S9003, the calibration control unit 5005 acquires threshold values for executing calibration for the paper type indicated by the printing paper ID value acquired in S9002 from the execution condition table in FIG. 7. That is, of the threshold values held in the column 7003 and column 7004 held in the execution condition table, each of the threshold values of the row corresponding to the printing paper ID value of the paper type fed to the printing apparatus 1001 is acquired. Furthermore, the calibration control unit 5005 acquires the count value of the degree of necessity of calibration corresponding to the paper type fed to the printing apparatus 1001. Moreover, the calibration control unit 5005 acquires the count value of the number of elapsed days since the day in which calibration was previously executed corresponding to the paper type fed to the printing apparatus 1001.

Additionally, the calibration control unit 5005 acquires, from the execution condition table of FIG. 7, the value of the calibration type to be executed for the paper type indicated by the printing paper ID value acquired in S9002.

In S9004, the calibration control unit 5005 determines whether to execute calibration for the fed paper type, based on the printing paper ID value acquired in S9002 and the threshold values acquired in S9003, which correspond to the printing paper ID value.

In a case where the threshold values acquired by the calibration control unit 5005 are values indicating "N/A", the paper type fed to the printing apparatus 1001 is a paper type for which calibration is not allowed or a paper type of which the automatic calibration operation is "No". Therefore, the calibration control unit 5005 determines that execution of calibration is unnecessary.

In a case where the acquired threshold values are not values indicating "N/A", the calibration control unit 5005 performs a determination based on the relationship as to which is greater and which is smaller between the threshold values and corresponding values. In the present embodiment, the calibration control unit 5005 determines whether the count value of the degree of necessity of calibration for the paper type fed to the printing apparatus 1001 is equal to or greater than the threshold value. Alternatively, it is determined whether the count value of the number of elapsed days since the day in which calibration was previously executed for the paper type fed to the printing apparatus 1001 is equal to or greater than the threshold value. In addition, there may be a mode in which the calibration control unit 5005 determines whether the count value of the degree of necessity of calibration for the paper type fed to the printing apparatus 1001 is greater than the threshold value. Alternatively, there may be a mode in which it is determined whether the count value of the number of elapsed days since the day in which calibration was previously executed for the paper type fed to the printing apparatus 1001 is greater than the threshold value.

In a case where the count value of the degree of necessity of calibration is equal to or greater than the threshold value, the calibration control unit 5005 determines to execute calibration for the paper type fed to the printing apparatus 1001. Alternatively, in a case where the count value of the number of elapsed days since the day in which calibration was previously executed is equal to or greater than the threshold value, the calibration control unit 5005 determines to execute calibration for the paper type fed to the printing apparatus 1001. For example, the calibration types corresponding to the paper types having printing paper ID values "01" and "02" in FIG. 7 are common calibration, and "0" is held as the threshold value in each of the column 7003 and the column 7004. Therefore, in a case where the execution condition table stored in the printing apparatus 1001 is as illustrated in FIG. 7 and the printing paper ID value of the paper type fed to the printing apparatus 1001 is "01" or "02", it is always determined that calibration is executed.

A correction value obtained as a result of executing common calibration is also applied to a paper type for which the automatic calibration operation is not performed. In a case where common calibration has not been executed for a long period of time for a common calibration paper type provided with a setting for performing the automatic calibration operation, it is not possible to maintain a tint for printing by use of a paper type for which calibration is not allowed. Therefore, in a case of printing by use of a paper type for which calibration is not allowed after a long period of time without executing common calibration, it is necessary to manually execute calibration by feeding a paper type for which common calibration is executed to the printing apparatus before the printing. In order to reduce such a labor on the user, it is preferable that the frequency of execution of common calibration is high. In the present embodiment, the frequency of execution of common calibration is increased by setting a threshold value for executing common calibration low.

On the other hand, as for the paper types having printing paper ID values "03" and "04", the calibration types are individual calibration, and "30" is held as each of the threshold values of the number of elapsed days in the column 7004. Therefore, in a case where the printing paper ID value of the paper type fed to the printing apparatus is "03" or "04", it is determined that execution of calibration is necessary in a case where 30 days have elapsed since calibration was executed for the paper type. Determination based on a threshold value of the degree of necessity of calibration in the column 7003 is similarly performed.

In the present embodiment, for individual calibration, it is possible to set a threshold value that is different from a threshold value for common calibration. Regarding individual calibration, unlike common calibration, it is not necessary to perform individual calibration for other paper types. Since it is possible to set a threshold value for individual calibration so that calibration is executed at an appropriate timing in accordance with the characteristics of a paper type, it is possible to reduce the use of consumables such as ink and printing paper along with execution of calibration.

Alternatively, as for the determination method in S9004, there may be a method in which it is determined that calibration is executed in a case where the count value of the degree of necessity of calibration and the count value of the number of elapsed days since the day in which calibration was previously executed are both equal to or greater than the threshold values.

In a case where it is determined that execution of calibration is necessary (YES in S9004), in S9005, the calibration control unit 5005 instructs the printer unit 5003 to execute calibration based on the value of the calibration type acquired in S9003. In response to the instruction received from the calibration control unit 5005, the printer unit 5003 executes calibration corresponding to the paper type fed to the printing apparatus 1001. In a case where it is not determined that execution of calibration is necessary (NO in S9004), the present flow is ended.

As explained above, according to the present embodiment, even in a case of operating calibration with a common calibration paper type and one or more individual calibration paper types, it is possible for the printing apparatus to execute calibration according to each paper type. Moreover, it is possible to change a calibration execution condition for each calibration type. Therefore, it is possible for the printing apparatus to execute calibration at an appropriate timing in accordance with the characteristics of each calibration type. Thus, according to the present embodiment, it is not necessary for the user to manage individual calibration, and it is possible to reduce the load on the user related to the operation of calibration.

Modification Example

Although it is assumed that the threshold values held in the execution condition table of FIG. 7 are set by the printing apparatus setting unit 5007 in the above explanation, there may be a mode in which the threshold values held in the execution condition table are preliminarily stored in the printing apparatus 1001. FIG. 10 is a figure illustrating an example of an execution condition table stored in the printing apparatus at the time of shipment.

In the execution condition table of FIG. 7 in the first embodiment described above, at the time of shipment, threshold values are not held in the column 7003 and the column 7004, which are configured to hold threshold values. On the other hand, in FIG. 10 which illustrates the execution condition table at the time of shipment in the modification example, threshold values are preliminarily held in the column 10001 and the column 10002, which are configured to hold threshold values. As explained above, even in the example where threshold values are preliminarily set in the execution condition table illustrated in FIG. 10, it is possible to reduce the load on the user related to operation of calibration. Note that the threshold values preliminarily stored in the execution condition table of FIG. 10 may be changed by the user after shipment as needed.

As described above, in the execution condition table of FIG. 10, the execution condition for common calibration and the execution condition for individual calibration are different. Specifically, in the example of FIG. 10, the execution conditions are set so that common calibration is more likely to be executed, compared to individual calibration. Since a correction value for multiple paper types is calculated in common calibration, there is an effect to correction for types of printing paper other than the type of printing paper set in the printing apparatus as well. On the other hand, in individual calibration, there is an effect only to correction for the type of printing paper that is set. Further, there is a possibility that some users do not desire that calibration is frequently executed. Therefore, by setting execution conditions as illustrated in FIG. 10, it is possible to facilitate execution of common calibration, which has a large degree of effect, and it is possible to prevent individual calibration from being frequently executed against desire of the user.

Note that it is also possible that an execution condition is set so that individual calibration for a specific paper type is more likely to be executed, compared to common calibration. For example, such an execution condition may be set in a case where there is a paper type that corresponds to individual calibration but correction for the paper type is particularly important or in a case where there is a paper type that is frequently used in particular. The setting may be set at the time of shipment of the printing apparatus or may be set as a result of changing of the setting by the user as described above.

In addition, in the above, an explanation is given of common calibration and individual calibration as the example of the types of calibration having different execution conditions. However, the present embodiment is not limited thereto. For example, there may be different execution conditions for two types of common calibration. For example, regarding two types of common calibration, in a case where the numbers of paper types to which the calculated correction values are applied are greatly different, it is considered that the type of calibration of which the correction is applied to the greater number of paper types has a larger degree of effect. Therefore, the execution conditions may be set so that the type of common calibration is executed more frequently. In addition, regarding two types of individual calibration, in a case where the importance levels of correction for paper types to which the calculated correction values are applied are different, it is considered that the importance level of individual calibration for the paper type having the higher importance level is higher as well. Therefore, the execution conditions may be set so that the type of individual calibration is executed more frequently.

Second Embodiment

The first embodiment is a mode in which the printing apparatuses 1001 to 1003 set execution condition tables, respectively. However, the present embodiment is a mode in which the management apparatus 1000 sets an execution condition table for the printing apparatuses 1001 to 1003. As for the present embodiment, differences from the first embodiment are mainly explained. Not-specified parts have the same configuration and processing as those in the first embodiment.

The printing apparatus setting unit 5007 of the printing apparatus of the present embodiment does not perform such processing for setting an execution condition table as illustrated in the flowchart of FIG. 8. In the present embodiment, the management apparatus setting unit 4001 of the management apparatus 1000 sets a calibration execution condition, or the like, of the printing apparatuses 1001 to 1003. The processing described below is performed in response to a predetermined instruction provided by the user to the management apparatus 1000.

Figure 11:
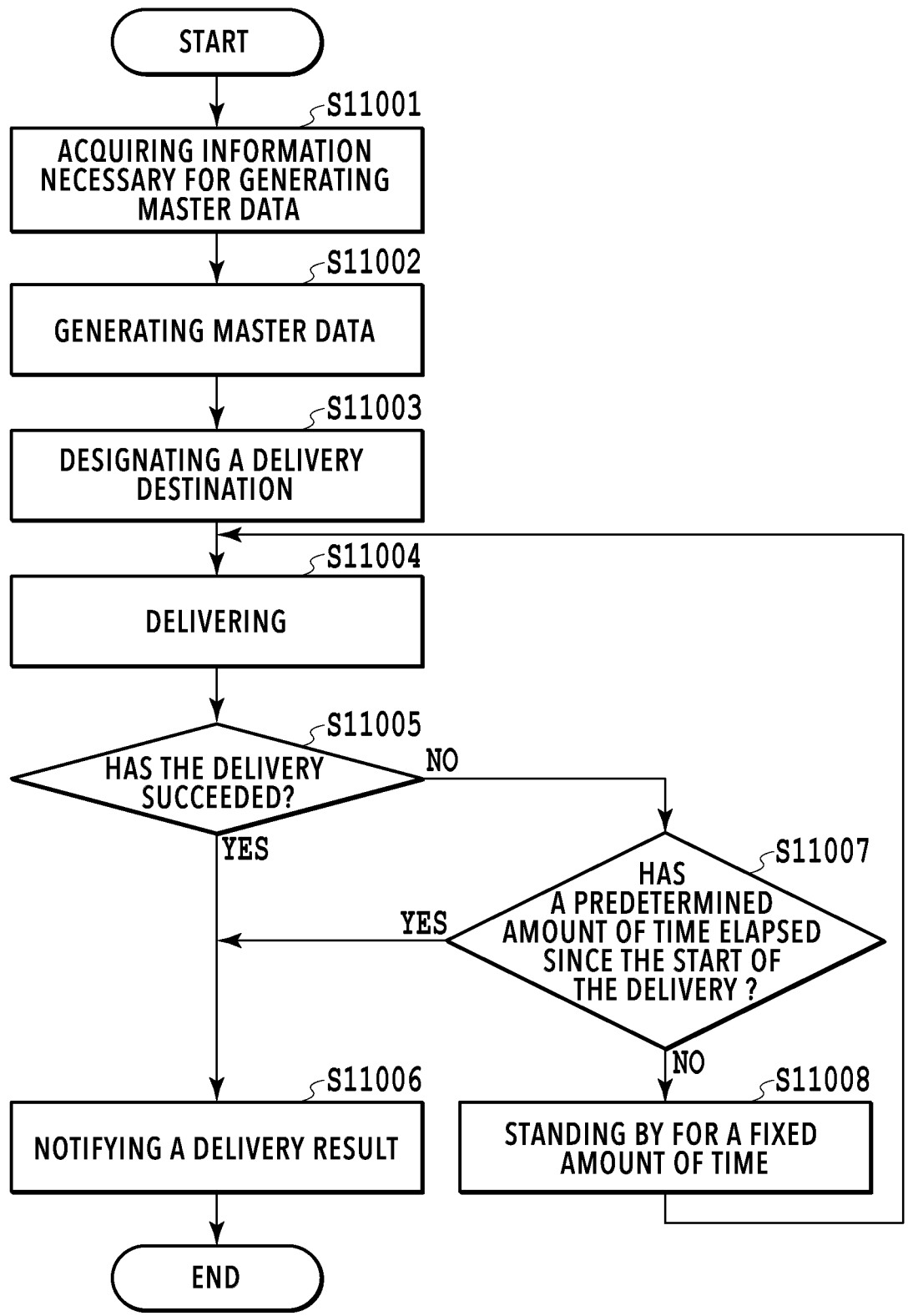
FIG. 11 is a flowchart for explaining processing for delivering master data.

FIG. 11 is a flowchart for explaining processing for setting a calibration execution condition for the printing apparatuses 1001 to 1003 by use of the management apparatus 1000 of the present embodiment. The series of processes illustrated in the flowchart of FIG. 11 is performed by the CPU of the management apparatus 1000 retrieving a program code stored in the ROM into the RAM and executing the program code.

In S11001, the management apparatus setting unit 4001 acquires data necessary for generating master data, which is common data for setting a calibration execution condition for the printing apparatuses 1001 to 1003. The management apparatus setting unit 4001 designates one of the printing apparatuses 1001 to 1003 as a master printing apparatus. As the data necessary for generating the master data, the management apparatus setting unit 4001 acquires an execution condition table stored in the master printing apparatus and data indicating whether the execution mode of the master printing apparatus is the manual mode or the automatic mode. The master printing apparatus may be any printing apparatus that satisfies the software configuration of the printing apparatus 1001 as illustrated in FIG. 5. In the explanation of the present embodiment, it is assumed that the printing apparatus 1001 is the master printing apparatus.

In S11002, the management apparatus setting unit 4001 generates the master data, based on the data acquired from the printing apparatus 1001, which is the master printing apparatus. The master data generated by the management apparatus setting unit 4001 is stored in the management apparatus 1000.

The management apparatus setting unit 4001 may use data that holds the same contents as the data acquired from the master printing apparatus as the master data. Alternatively, it is possible that the data acquired from the master printing apparatus is edited based on an instruction from the user, so as to generate the master data. For example, it is assumed that the execution condition table in FIG. 7 is an execution condition table acquired from the master printing apparatus. In the execution condition table, editable data are the values indicating the automatic calibration operation and the threshold values for executing calibration, which are held in the columns 7002 to 7004. For example, it is possible that the management apparatus setting unit 4001 uses data obtained by changing the value in the column 7002 corresponding to printing paper ID value "04" to a value indicating "No" as the master data.

Furthermore, there may be a mode in which the threshold values held in the column 7003 and the column 7004 can be changed on a per paper type basis. For example, there may be a mode in which threshold values held in the column 7003 for printing paper ID value "03" and printing paper ID value "04" are not the same and can be changed so as to be different threshold values.

In S11003, the management apparatus setting unit 4001 designates a delivery destination of the master data. Alternatively, there may be a method in which printing apparatuses searched by the management apparatus communication unit 4003 become delivery destinations. In the present embodiment, it is assumed that the delivery destinations are the printing apparatuses 1001 to 1003.

In S11004, the management apparatus setting unit 4001 delivers the master data to all of the printing apparatuses 1001 to 1003, which are designated as the delivery destinations, via the management apparatus communication unit 4003.

In S11005, the management apparatus setting unit 4001 determines whether delivery to the printing apparatuses that are the delivery destinations has succeeded. For example, in a case of receiving a response, which indicates that the master data has been received, from a printing apparatus that is a delivery destination, the management apparatus setting unit 4001 determines that delivery to the printing apparatus that is the delivery destination has succeeded.

In a case where it is determined that the master data has not been delivered to all of the printing apparatuses (NO in S11005), the management apparatus setting unit 4001 determines, in S11007, whether a predetermined amount of time has elapsed since the first delivery of the master data. For example, the management apparatus setting unit 4001 determines whether six hours have elapsed since the first delivery of the master data.

In a case where it is determined that the predetermined amount of time has not elapsed since the first delivery of the master data (NO in S11007), the management apparatus setting unit 4001 stands by for a fixed amount of time in S11008. The fixed amount of time is, for example, 30 minutes. After the fixed amount of time has elapsed, the processing returns to S11004 and the management apparatus setting unit 4001 executes (retries) delivery of the master data again to a printing apparatus to which the master data has not been delivered.

In a case where it is determined that the master data has been delivered to all of the printing apparatuses (YES in S11005) or in a case where it is determined that the predetermined amount of time has elapsed since the first delivery of the master data (YES in S11007), the processing proceeds to S11006.

In S11006, the notification unit 4005 notifies a delivery result of the master data to a predetermined notification destination. For example, the management apparatus setting unit 4001 generates contents including a title and a main body of an e-mail indicating information about a printing apparatus to which delivery has succeeded and a printing apparatus to which delivery has failed. The notification unit 4005 notifies the contents of the e-mail generated by the management apparatus setting unit 4001 to a notification destination registered in the printing apparatus management unit 4000. Alternatively, the notification method may be push notification or notification to a predetermined log server.

In the printing apparatus to which the master data has been delivered, a calibration execution condition and the execution mode are set, based on the delivered master data. The execution condition table stored in the HDD 2003 of the printing apparatus 1001 is updated, based on the master data received by the printing apparatus 1001. Even in a case where the execution condition table is stored in a non-volatile memory, or the like, the execution condition table is updated, based on the received master data. Therefore, it is possible for the management apparatus 1000 to make a printing apparatus that is a management target to execute calibration according to the calibration execution condition and the execution mode that are set based on the master data.

As explained above, according to the present embodiment, it is not necessary to set a calibration execution condition for each printing apparatus. Therefore, according to the present embodiment, it is possible to reduce a management load on the user even in a case where a number of printing apparatuses are installed.

The above-described embodiment is a mode in which a master printing apparatus is designated and master data is generated based on data that is set in the master printing apparatus, so as to set the master data to be delivered by the management apparatus 1000. In addition, for example, there may be a mode in which the management apparatus 1000 manages master data in the first place without being mediated by the master printing apparatus. Furthermore, as explained in the modification example of the first embodiment, there may be a mode in which a table indicating calibration execution conditions as illustrated in FIG. 10 is preliminarily stored in the management apparatus 1000.

There may be a mode in which any one of the printing apparatuses has functions similar to those of the printing apparatus management unit 4000 and the management apparatus setting unit 4001 so that the printing apparatus delivers master data to the other printing apparatuses. Furthermore, since the management apparatus setting unit 4001 sets a calibration execution condition, etc., in the present embodiment, there may be a mode in which the printing apparatus setting unit 5007 is omitted.

Third Embodiment

Figure 12:
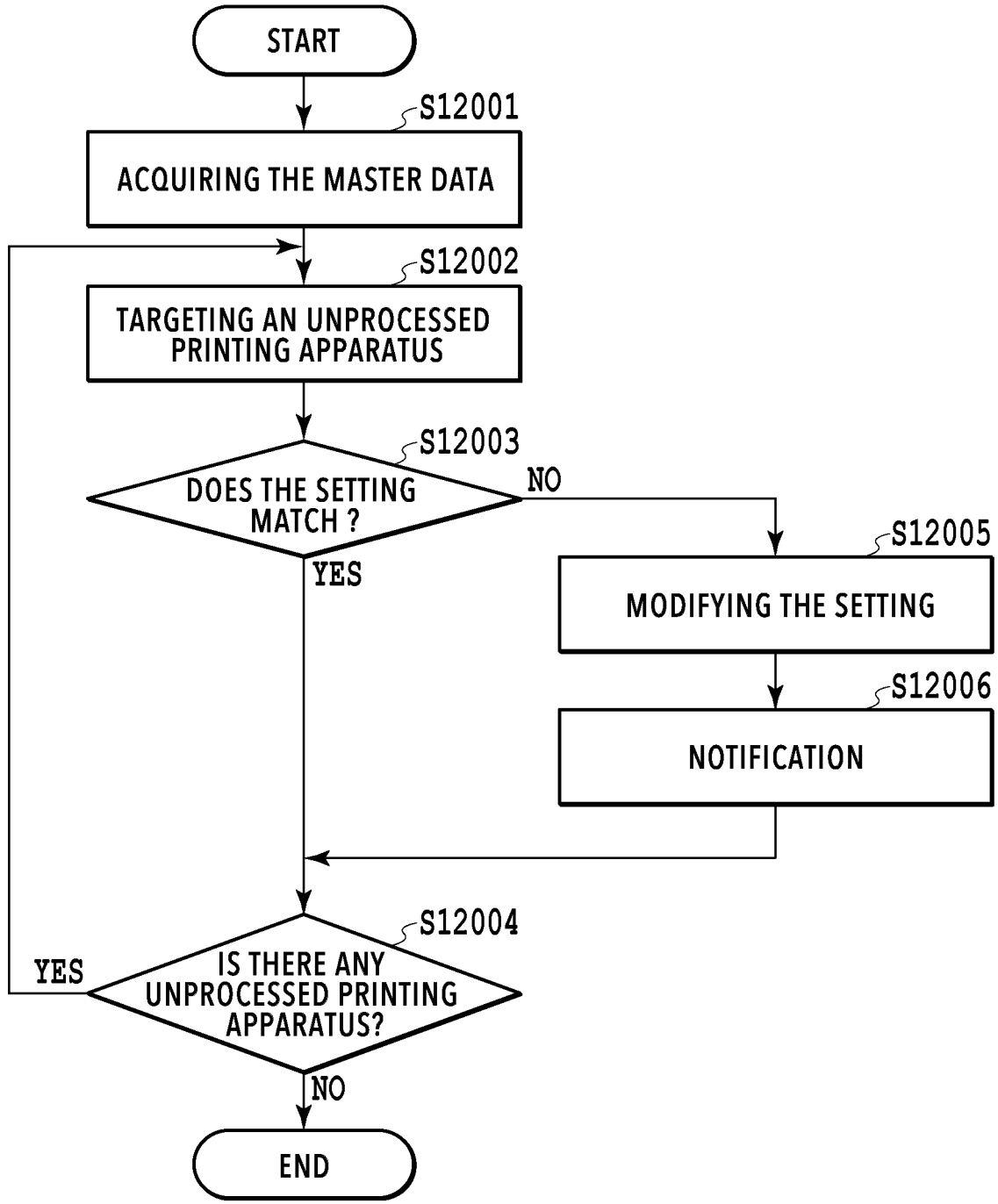
FIG. 12 is a flowchart for explaining processing for monitoring execution conditions for a printing apparatus.

The present embodiment is a mode in which the management apparatus 1000 monitors whether contents of master data are different from a setting related to execution of calibration, which is set in a printing apparatus. As for the present embodiment, differences from the second embodiment are mainly explained. Not-specified parts have the same configuration and processing as those in the second embodiment. FIG. 12 is a flowchart for explaining monitoring processing performed by the management apparatus 1000. The series of processes illustrated in the flowchart of FIG. 12 is performed by the CPU of the management apparatus 1000 retrieving a program code stored in the ROM into the RAM and executing the program code. The processing explained below is performed in response to an instruction by a scheduler of the management apparatus 1000 for executing the processing.

In S12001, the monitoring unit 4002 acquires master data generated by the management apparatus setting unit 4001.

Subsequently, in S12002 to S12006, the processes of S12002 to S12006 are repeated for each printing apparatus that is a management target. That is, a printing apparatus that is a process target is targeted from among unprocessed printing apparatuses in S12002, and the processes of S12003 to S12006 are performed. In a case where processing for a printing apparatus that is a process target is completed, the processing returns to S12002 and a printing apparatus that is a process target is targeted from among unprocessed printing apparatuses again. In a case where there are no more unprocessed printing apparatuses, the processing is ended.

In S12003, the monitoring unit 4002 determines whether the setting of the calibration execution condition of the printing apparatus that is the process target matches the contents of the master data. The determination method is acquiring information stored in the HDD 2003 of the printing apparatus 1002 and comparing the information with the master data. The information stored in the HDD 2003 may be replaced by information stored in a non-volatile memory, or the like.

In a case where it is determined that the setting of the printing apparatus that is the process target does not match the master data (NO in S12003), the monitoring unit 4002 changes the setting related to the calibration execution condition of the printing apparatus that is the process target to the same setting as the master data in S12005.

In S12006, the notification unit 4005 provides a predetermined notification destination with a predetermined notification indicating that the setting of the printing apparatus has been changed. As for the predetermined notification, for example, the monitoring unit 4002 generates contents including a title and a main body of an e-mail indicating a management number of the printing apparatus whose setting has been changed and indicating that the setting has been changed. Then, the notification unit 4005 notifies the contents of the e-mail generated by the monitoring unit 4002 to the notification destination registered in the management apparatus 1000. Alternatively, the notification method may be push notification or notification to a predetermined log server.

In a case where the setting of the printing apparatus that is the process target matches the master data (YES in S12003), the monitoring unit 4002 determines, in S12004, whether there is an unprocessed printing apparatus. In a case where there is an unprocessed printing apparatus, the processing returns to S12002, so that S12002 to S12006 are repeated. In a case where there is no unprocessed printing apparatus, the present flow is ended.

As explained above, according to the present embodiment, it is possible to check a calibration execution condition without checking each of multiple printing apparatuses by the user. Furthermore, in a case where the setting of a printing apparatus is different from the master data, the setting of the printing apparatus is changed to match the contents of the master data. Therefore, according to the present embodiment, even in a system having a large number of printing apparatuses, the management load on the user can be reduced.

Note that, although it is assumed that the monitoring unit 4002 of the management apparatus 1000 performs the monitoring processing in the explanation of the present embodiment, there may be a mode in which a printing apparatus having the functions of the printing apparatus management unit 4000 and the monitoring unit 4002 monitors the other printing apparatuses.

Other Embodiments

Although explanations are given of the systems including a management apparatus and a printing apparatus in the above-described embodiments, the first embodiment may be a mode in which only a printing apparatus is included.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-007314, filed Jan. 18, 2019, which is hereby incorporated by reference wherein in its entirety.

What is claimed is:

1. A printing apparatus for executing a first calibration and a second calibration different from the first calibration, the printing apparatus capable of using a plurality of types of printing paper, with the first calibration being processing for calculating a correction value which is to be used for correction to print on a type of printing paper used in executing the first calibration and is to be used for correction to print on a different type of printing paper from the type of printing paper used in executing the first calibration, and with the second calibration being processing for calculating a correction value which is to be used for correction to print on a type of printing paper used in executing the second calibration and is not to be used for correction to print on a different type of printing paper from the type of printing paper used in executing the second calibration, the printing apparatus comprising:

a control unit configured to control the printing apparatus to execute either one of the first calibration and the second calibration in a case where a predetermined execution condition corresponding to a type of printing paper that is set in the printing apparatus is satisfied, wherein the control unit is configured to control the printing apparatus to execute the first calibration in a case where the type of printing paper that is set in the printing apparatus is a first type that is included in the plurality of types and is configured to control the printing apparatus to execute the second calibration in a case where the type of printing paper that is set in the printing apparatus is a second type different from the first type, the second type being included in the plurality of types, wherein the control unit is configured to determine whether the predetermined execution condition is satisfied, based on a relationship as to which is greater and which is smaller between a predetermined threshold value and a count value corresponding to a number of elapsed days since calibration was previously executed for the type of printing paper that is set in the printing apparatus, and wherein the predetermined execution condition corresponding to the first type is a first condition and the predetermined execution condition corresponding to the second type is a second condition, the first condition and the second condition being different from each other in that the predetermined threshold value for the first condition is different from the predetermined threshold value for the second condition.

2. The printing apparatus according to claim 1, wherein the predetermined execution condition is determined to be satisfied in a case where the count value corresponding to the number of elapsed days since calibration was previously executed for the type of printing paper that is set in the printing apparatus is equal to or greater than the predetermined threshold value.

3. The printing apparatus according to claim 2, wherein the predetermined threshold value for the first condition is smaller than the predetermined threshold value for the second condition.

4. The printing apparatus according to claim 1, wherein a timing in which the control unit determines whether the predetermined execution condition is satisfied is at least one of a timing in which the printing apparatus is activated, a timing in which a print job is received, a timing in which printing is completed, a timing in which printing paper is fed, a timing of returning from sleep, and after replacement of an ink tank.

5. The printing apparatus according to claim 1 further comprising a setting unit configured to set so that a number of types of printing paper to be a target of execution of the first calibration is one.

6. The printing apparatus according to claim 1, wherein, for the printing apparatus, the first condition and the second condition are set so that the second calibration is more likely to be executed, compared to the first calibration.

7. A control system comprising:
one or more printing apparatuses; and
a management apparatus,
wherein the one or more printing apparatuses include the printing apparatus according to claim 1, and
wherein the management apparatus is configured to deliver common data to the one or more printing apparatuses, the common data being used by each of the one or more printing apparatuses to set an execution condition for calibration.

8. The control system according to claim 7, wherein the management apparatus further includes:
a monitoring unit configured to monitor whether contents of the common data match a setting related to the execution condition for each of the one or more printing apparatuses; and
a changing unit configured to change the setting so that the setting corresponds to the contents of the common data in a case where the common data does not match the setting.

9. A printing apparatus for executing a first calibration and a second calibration different from the first calibration, the printing apparatus being capable of using a plurality of types of printing paper, with the first calibration being processing for calculating a correction value which is to be used for correction to print on a type of printing paper used in executing the first calibration and is to be used for correction to print on a different type of printing paper from the type of printing paper used in executing the first calibration, and with the second calibration being processing for calculating a correction value which is to be used for correction to print on a type of printing paper used in executing the second calibration and is not to be used for correction to print on a different type of printing paper from the type of printing paper used in executing the second calibration, the printing apparatus comprising:

a control unit configured to control the printing apparatus to execute either one of the first calibration and the second calibration in a case where a predetermined execution condition corresponding to a type of printing paper that is set in the printing apparatus is satisfied, wherein the control unit is configured to control the printing apparatus to execute the first calibration in a case where the type of printing paper that is set in the printing apparatus is a first type that is included in the plurality of types and is configured to control the printing apparatus to execute the second calibration in a case where the type of printing paper that is set in the printing apparatus is a second type different from the first type, the second type being included in the plurality of types, wherein the control unit is configured to determine whether the predetermined execution condition is satisfied, based on a relationship as to which is greater and which is smaller between a predetermined threshold value and a count value corresponding to a degree of necessity of calibration for the type of printing paper that is set in the printing apparatus, and wherein the predetermined execution condition corresponding to the first type is a first condition and the predetermined execution condition corresponding to the second type is a second condition, the first condition and the second condition being different from each other in that the predetermined threshold value for the first condition is different from the predetermined threshold value for the second condition.

10. The printing apparatus according to claim 9, wherein the control unit is configured to determined that the predetermined execution condition is satisfied in a case where the count value corresponding to the degree of necessity of calibration for the type of printing paper that is set in the printing apparatus is equal to or greater than the first predetermined threshold value.

11. The printing apparatus according to claim 10, wherein the predetermined threshold value for the first condition is smaller than the predetermined threshold value for the second condition.

12. The printing apparatus according to claim 9, wherein a timing in which the control unit determines whether the predetermined execution condition is satisfied is at least one of a timing in which the printing apparatus is activated, a timing in which a print job is received, a timing in which printing is completed, and a timing in which printing paper.

13. The printing apparatus according to claim 9, further comprising a setting unit configured to set so that a number of types of printing paper to be a target of execution of the first calibration is one.

14. The printing apparatus according to claim 9, wherein, for the printing apparatus, the first condition and the second condition are set so that the second calibration is more likely to be executed, compared to the first calibration.

\* \* \* \* \*